United States Patent
Liu et al.

(10) Patent No.: US 11,039,379 B2
(45) Date of Patent: Jun. 15, 2021

(54) RADIO ACCESS METHOD, APPARATUS, SYSTEM, AND COMPUTER STORAGE MEDIUM

(71) Applicant: ZTE CORPORATION, Guangdong (CN)

(72) Inventors: Kun Liu, Shenzhen (CN); Zhaohua Lu, Shenzhen (CN); Yijian Chen, Shenzhen (CN); Peng Hao, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 66 days.

(21) Appl. No.: 16/323,484

(22) PCT Filed: Jan. 22, 2017

(86) PCT No.: PCT/CN2017/072060
§ 371 (c)(1),
(2) Date: Mar. 20, 2019

(87) PCT Pub. No.: WO2018/028156
PCT Pub. Date: Feb. 15, 2018

(65) Prior Publication Data
US 2020/0068480 A1    Feb. 27, 2020

(30) Foreign Application Priority Data

Aug. 10, 2016 (CN) .......................... 201610654236.6

(51) Int. Cl.
| | |
|---|---|
| H04W 48/16 | (2009.01) |
| H04L 5/00 | (2006.01) |
| H04W 16/28 | (2009.01) |
| H04W 28/16 | (2009.01) |
| H04W 72/04 | (2009.01) |

(52) U.S. Cl.
CPC .......... *H04W 48/16* (2013.01); *H04L 5/0048* (2013.01); *H04L 5/0053* (2013.01); *H04W 16/28* (2013.01); *H04W 28/16* (2013.01); *H04W 72/042* (2013.01)

(58) Field of Classification Search
None
See application file for complete search history.

(56) References Cited

U.S. PATENT DOCUMENTS

| | | | |
|---|---|---|---|
| 2011/0019694 A1* | 1/2011 | Kwon | H04L 27/2613 370/474 |
| 2015/0208443 A1* | 7/2015 | Jung | H04W 72/042 370/329 |
| 2018/0076881 A1* | 3/2018 | Zhu | H04B 7/0452 |

FOREIGN PATENT DOCUMENTS

| | | |
|---|---|---|
| CN | 101527966 A | 9/2009 |
| CN | 102740495 A | 10/2012 |

(Continued)

OTHER PUBLICATIONS

International Search Report and Written Opinion for International Appl. No. PCT/CN2017/072060, dated May 24, 2017.

*Primary Examiner* — Faruk Hamza
*Assistant Examiner* — Alan L Lindenbaum
(74) *Attorney, Agent, or Firm* — Foley & Lardner LLP

(57) ABSTRACT

Embodiments of the present invention provide a radio access method, apparatus and system, and a computer storage medium. The method may include: receiving indication signaling transmitted by a base station, determining a transmission mode of an access signal according to the indication signaling and transmitting the access signal in the transmission mode.

3 Claims, 6 Drawing Sheets

(56) References Cited

FOREIGN PATENT DOCUMENTS

| CN | 104521312 A | 4/2015 |
| CN | 104718712 A | 6/2015 |

\* cited by examiner

RADIO ACCESS METHOD, APPARATUS, SYSTEM, AND COMPUTER STORAGE MEDIUM

CROSS-REFERENCE TO RELATED APPLICATIONS

This is a U.S. National Stage Application, under 35 U.S.C. 371, of International Patent Application No. PCT/CN2017/072060, filed on Jan. 22, 2017, which claims priority to Chinese Patent Application No. 201610654236.6 filed on Aug. 10, 2016, the contents of both of which are incorporated herein by reference in their entireties.

TECHNICAL FIELD

The present invention relates to wireless communication technologies and, in particular, to a radio access method, apparatus and system, and a computer storage medium.

BACKGROUND

With the development of intelligent terminals and the enrichment of wireless data application services, data users in a wireless communication network have increased greatly and wireless data content is no longer limited to a traditional text or image, increasingly more multimedia services such as high-definition videos and mobile TVs are emerging, resulting in an explosive growth of wireless network traffic. The mobile Internet and the Internet of Things will become a main driving force for mobile communication development.

To meet requirements for diversified services in residential, work, leisure and transportation areas and to provide users with extremely good service experience such as ultra-high definition videos, virtual reality, augmented reality, cloud desktops and online games in scenarios such as dense residential areas, offices, stadiums, open-air gatherings, subways, expressways, high-speed rails and wide-area coverage which are characterized by ultra-high traffic density, ultra-high connection density and ultra-high mobility, the 5G mobile communication technology can solve and deal with the above challenges. Main 5G technical scenarios may be summarized as: a continuous wide-area coverage scenario, a high-capacity hot-spot scenario, a low-power-consumption high-connection-density scenario and a low-delay high-reliability scenario.

Currently, 5G requirements are satisfied by various methods, which may mainly include improving spectrum efficiency, increasing network density, increasing a system bandwidth, intelligent traffic splitting and reducing system broadcast control overheads. Improving the spectrum efficiency is an effective means. In short, improving the spectrum efficiency is to improve data transmission reliability as much as possible. Especially the spectrum resources between 300 MHz and 3 GHz used in the traditional commercial communications become increasingly tight, and the traditional commercial spectrum cannot meet the future wireless communication requirements. In the future, communications will be implemented at higher carrier frequencies such as 28 GHz and 45 GHz.

However, such high frequency channel has defects of a larger free propagation loss, being easily absorbed by oxygen and being affected by rain attenuation, which seriously affects coverage performance of a high frequency communication system. Once the coverage performance is affected, a system access success rate is significantly affected.

SUMMARY

To solve the above-mentioned technical problem, embodiments of the present disclosure desire to provide a radio access method, apparatus and system, and a computer storage medium.

The technical solutions of the present disclosure are implemented as follows:

In a first aspect, an embodiment of the present disclosure provides a radio access method. The method includes the steps described below.

Indication signaling transmitted by a base station is received.

A transmission mode is determined for an access signal according to the indication signaling.

The access signal is transmitted in the transmission mode.

In the above solution, the indication signaling includes access manner notification signaling or a reference signal.

In the above solution, the transmission mode includes a transmit beam and/or a transmit beam direction.

In the above solution, the step of determining the transmission mode for the access signal according to the indication signaling includes the step described below.

The transmission mode is determined according to the access manner notification signaling, or the transmission mode is determined according to a reference signal detection.

In the above solution, the step of determining the transmission mode of the access signal includes:

determining a baseband precoding matrix and determining a baseband signal of the access signal according to the baseband precoding matrix; or determining a radio frequency precoding matrix and determining a radio frequency signal of the access signal according to the radio frequency precoding matrix; or determining a transmit antenna pattern of the access signal; or determining a transmit antenna port of the access signal is determined; or determining transmit power of the access signal is determined.

In the above solution, the step of determining the transmission mode according to a reference signal detection includes:

detecting a reference signal transmitted in M transmission modes, where M is greater than or equal to 1;

selecting N transmission modes from the M transmission modes of the reference signal, where N is less than or equal to M; and determining N transmission modes of the access signal at least according to the selected N transmission modes of the reference signal.

In the above solution, the reference signal includes at least one of:

a base station-specific reference signal configured by the base station;

a dedicated demodulation reference signal configured by the base station;

a dedicated reference signal, configured by the base station, for a terminal to select a beam direction;

a dedicated reference signal, configured by the base station, for the terminal to select the transmission mode; and a downlink synchronization signal.

In the above solution, in response to an access signal transmission failure, the method further includes the step described below.

The transmission mode of the access signal is re-determined according to the indication signaling, and the access signal is transmitted in the re-determined transmission mode.

In the above solution, a number of access signal transmission failures is K, where K is greater than or equal to 1.

In the above solution, the access signal transmission failure includes: failing to receive an access response signal, or receiving an access response signal carrying no response information corresponding to the access signal.

In the above solution, an access channel resource occupied by the access signal has a first mapping relationship with the transmission mode of the access signal.

Alternatively, the access channel resource occupied by the access signal has a second mapping relationship with the transmission mode of the reference signal.

Alternatively, the access signal has a third mapping relationship with the transmission mode of the access signal.

Alternatively, the access signal has a fourth mapping relationship with a transmission mode of the reference signal.

In a second aspect, an embodiment of the present disclosure provides a radio access method. The method includes the step described below.

A terminal transmits an access signal by a first method and transmits the access signal by a second method after K access signal transmission failures.

The first method is the radio access method described in the first aspect and the second method is configured by a base station or determined by the terminal; the first method is different from the second method; and K is greater than or equal to 1.

In the above solution, when the terminal transmits the access signal by the first method, the access signal occupies a first access channel resource.

When the terminal transmits the access signal by the second method, the access signal occupies a second access channel resource. The first access channel resource and the second access channel resource are configured by the base station.

In the above solution, when the terminal transmits the access signal by the second method, a transmit antenna pattern of the terminal is an omnidirectional antenna pattern.

In a third aspect, an embodiment of the present disclosure provides a radio access method. The method includes the step described below.

A terminal selects N1 access channel resources from access channel resources and transmits an access signal in N2 transmission modes, where N1 is a positive integer and N2 is a positive integer less than or equal to N1.

In the above solution, the access signal is transmitted in the N2 transmission modes each time within a preset number of transmissions; after the preset number of transmissions, the access signal is transmitted in N3 transmission modes; where N3 is a positive integer, and the N3 transmission modes are different from the N2 transmission modes.

In the above solution, the N3 transmission modes are different from the N2 transmission modes in one of the manners described below.

The N3 transmission modes are different from part of the N2 transmission modes.

The N3 transmission modes are different from all of the N2 transmission modes.

In the above solution, the preset number of transmissions is configured by a base station or configured by default or configured by the terminal.

In the above solution, both the N2 transmission modes and the N3 transmission modes are selected from a transmission mode set Q.

In the above solution, a transmission mode in the transmission mode set Q is configured by a base station or configured by default or determined by the terminal according to a reference signal detection.

In the above solution, the reference signal includes at least one of:

a base station-specific reference signal configured by the base station;

a dedicated demodulation reference signal configured by the base station;

a dedicated reference signal, configured by the base station, for the terminal to select a beam direction;

a dedicated reference signal, configured by the base station, for the terminal to select the transmission mode; and a downlink synchronization signal.

In the above solution, the step in which the terminal selects the N1 access channel resources from the access channel resources and transmits the access signal in the N2 transmission modes specifically includes the steps described below.

The terminal selects an access signal set from P access signal sets, selects an access signal from the selected access signal set, and transmits the selected access signal on the select N1 access channel resources.

The P access signal sets have a one-to-one mapping relationship with transmission modes in which a base station transmits a reference signal to the terminal.

In the above solution, after the terminal selects the N1 access channel resources from the access channel resources and transmits the access signal in the N2 transmission modes, the method further includes that the terminal receives an access response message transmitted by the base station.

In the above solution, a transmission mode in which the base station transmits the access response message is the same as a transmission mode of a reference signal corresponding to an access signal set to which an access signal selected by the terminal belongs.

In the above solution, the access response message includes at least one of:

indication information of a transmission mode in which an uplink data message is transmitted to the base station;

indication information of an index of an access channel used by the terminal to transmit the access signal; and indication information of an index of an access channel on which the access signal transmitted by the terminal has been detected by the base station.

In a fourth aspect, an embodiment of the present disclosure provides a radio access method. The method includes the steps described below.

A terminal transmits an access signal by a first method when a preset condition is satisfied.

The terminal transmits the access signal by a second method when the preset condition is not satisfied.

The first method is the radio access method described in the first aspect.

The second method is the radio access method described in the third aspect.

In the above solution, the preset condition is that an uplink channel and a downlink channel have reciprocity.

In the above solution, the reciprocity includes at least the following:

the uplink channel and the downlink channel adopt a time division duplex (TDD) mode;

a channel characteristic for a base station to transmit a signal has reciprocity with a channel characteristic for the base station to receive a signal, and a channel characteristic for the terminal to transmit a signal has reciprocity with a channel characteristic for the terminal to receive a signal; and an antenna port used by the base station to transmit the signal is the same as an antenna port used by the base station to receive the signal, and an antenna port used by the terminal to transmit the signal is the same as an antenna port used by the terminal to receive the signal.

In the above solution, when the terminal transmits the access signal by the first method, the terminal occupies a first access channel resource to transmit the access signal to a base station.

When the terminal transmits the access signal by the second method, the terminal occupies a second access channel resource to transmit the access signal to the base station.

In a fifth aspect, an embodiment of the present disclosure provides a terminal. The terminal includes a first receiving module, a first determining module and a first transmitting module.

The first receiving module is configured to receive indication signaling transmitted by a base station.

The first determining module is configured to determine a transmission mode of an access signal according to the indication signaling.

The first transmitting module is configured to transmit the access signal in the transmission mode.

In the above solution, the indication signaling includes access manner notification signaling or a reference signal.

In the above solution, the transmission mode includes a transmit beam and/or a transmit beam direction.

In the above solution, the first determining module is configured to:

determine the transmission mode is determined according to the access manner notification signaling, or determine the transmission mode according to a reference signal detection.

In the above solution, the first determining module is configured to:

determine a baseband precoding matrix and determine a baseband signal of the access signal according to the baseband precoding matrix; or determine a radio frequency precoding matrix and determine a radio frequency signal of the access signal according to the radio frequency precoding matrix; or determine a transmit antenna pattern of the access signal; or determine a transmit antenna port of the access signal; or determine transmit power of the access signal.

In the above solution, the first determining module is configured to:

detect a reference signal transmitted in M transmission modes, where M is greater than or equal to 1;

select N transmission modes from the M transmission modes of the reference signal, where N is less than or equal to M; and determine the N transmission modes of the access signal at least according to the selected N transmission modes of the reference signal.

In the above solution, the reference signal includes at least one of:

a base station-specific reference signal configured by the base station;

a dedicated demodulation reference signal configured by the base station;

a dedicated reference signal, configured by the base station, for the terminal to select a beam direction;

a dedicated reference signal, configured by the base station, for the terminal to select the transmission mode; and a downlink synchronization signal.

In the above solution, the terminal further includes a re-determining module. The re-determining module is configured to re-determine the transmission mode of the access signal according to the indication signaling.

Accordingly, the first transmitting module is further configured to transmit the access signal in the re-determined transmission mode.

In the above solution, an access signal transmission failure includes: failing to receive an access response signal, or the received access response signal carrying no response information corresponding to the access signal.

In the above solution, an access channel resource occupied by the access signal has a first mapping relationship with the transmission mode of the access signal.

Alternatively, the access channel resource occupied by the access signal has a second mapping relationship with the transmission mode of the reference signal.

Alternatively, the access signal has a third mapping relationship with the transmission mode of the access signal.

Alternatively, the access signal has a fourth mapping relationship with a transmission mode of the reference signal.

In a sixth aspect, an embodiment of the present disclosure provides a terminal. The terminal includes a second transmitting module. The second transmitting module is configured to transmit an access signal by a first method and transmit the access signal by a second method after K access signal transmission failures.

The first method is the radio access method described in the first aspect and the second method is configured by a base station or determined by the terminal; the first method is different from the second method; and K is greater than or equal to 1.

In the above solution, when the second transmitting module transmits the access signal by the first method, the access signal occupies a first access channel resource.

When the second transmitting module transmits the access signal by the second method, the access signal occupies a second access channel resource. The first access channel resource and the second access channel resource are configured by the base station.

In the above solution, when the second transmitting module transmits the access signal by the second method, a transmit antenna pattern of the second transmitting module is an omnidirectional antenna pattern.

In a seventh aspect, an embodiment of the present disclosure provides a terminal. The terminal includes a selecting module and a third transmitting module. The selecting module is configured to select N1 access channel resources from access channel resources.

The third transmitting module is configured to transmit an access signal in N2 transmission modes; where N1 is a positive integer and N2 is a positive integer less than or equal to N1.

In the above solution, the third transmitting module is configured to transmit the access signal in the N2 transmission modes each time within a preset number of transmissions, and transmit the access signal in N3 transmission modes after the preset number of transmissions; where N3 is a positive integer, and the N3 transmission modes are different from the N2 transmission modes.

In the above solution, the selecting module is configured to select an access signal set from P access signal sets and select an access signal from the selected access signal set.

The third transmitting module is configured to transmit the selected access signal on the selected N1 access channel resources.

The P access signal sets have a one-to-one mapping relationship with transmission modes using which a base station transmits a reference signal to the terminal.

In the above solution, the terminal further includes a second receiving module. The second receiving module is configured to receive an access response message transmitted by the base station.

In the above solution, a transmission mode of the access response message transmitted by the base station is the same as a transmission mode of a reference signal corresponding to an access signal set to which an access signal selected by the terminal belongs.

In the above solution, the access response message includes at least one of:

indication information of a transmission mode of an uplink data message transmitted to the base station;

indication information of an index of an access channel used by the terminal to transmit the access signal; and indication information of an index of an access channel on which the access signal transmitted by the terminal has been detected by the base station.

In an eighth aspect, an embodiment of the present disclosure provides a terminal. The terminal includes a second determining module, a fourth transmitting module and a first transmitting module.

The second determining module is configured to: determine whether a preset condition is satisfied;

trigger the fourth transmitting module when the preset condition is satisfied; and trigger the fifth transmitting module when the preset condition is not satisfied.

The fourth transmitting module is configured to transmit an access signal by a first method.

The fifth transmitting module is configured to transmit the access signal by a second method.

The first method is the radio access method described in the first aspect.

The second method is the radio access method described in the third aspect.

In the above solution, the preset condition is that an uplink channel and a downlink channel have reciprocity.

In the above solution, the reciprocity includes at least the following: the uplink channel and the downlink channel adopt a TDD mode;

the reciprocity exists between a channel for the base station to transmit a signal and a channel for the base station to receive a signal, and the reciprocity exists between a channel for the terminal to transmit a signal and a channel for the terminal to receive a signal; and an antenna port used by the base station to transmit the signal is the same as an antenna port used by the base station to receive the signal, and an antenna port used by the terminal to transmit the signal is the same as an antenna port used by the terminal to receive the signal.

In the above solution, when the fourth transmitting module transmits the access signal by the first method, the access signal occupies a first access channel resource.

When the fifth transmitting module transmits the access signal by the second method, the access signal occupies a second access channel resource.

In a ninth aspect, an embodiment of the present disclosure provides a radio access system. The system includes a terminal and a base station.

The terminal is configured to receive indication signaling transmitted by the base station;

determine a transmission mode of an access signal according to the indication signaling; and transmit the access signal in the transmission mode.

The base station is configured to transmit the indication signaling to the terminal; and receive the access signal transmitted by the terminal.

In a tenth aspect, an embodiment of the present disclosure provides a computer storage medium which includes a set of instructions. When the set of instructions are executed, at least one processor is caused to execute the radio access methods described above.

The embodiments of the present invention provide a radio access method, apparatus and system and a computer storage medium. The terminal determines the transmission mode of the access signal according to the indication signaling of the base station and transmits the access signal. A complete set of access procedures is provided, which effectively increases an access success rate in a high frequency communication system.

DETAILED DESCRIPTION

Technical solutions in embodiments of the present invention will be described clearly and completely in conjunction with the drawings in the embodiments of the present disclosure.

Embodiment 1

Figure 1:
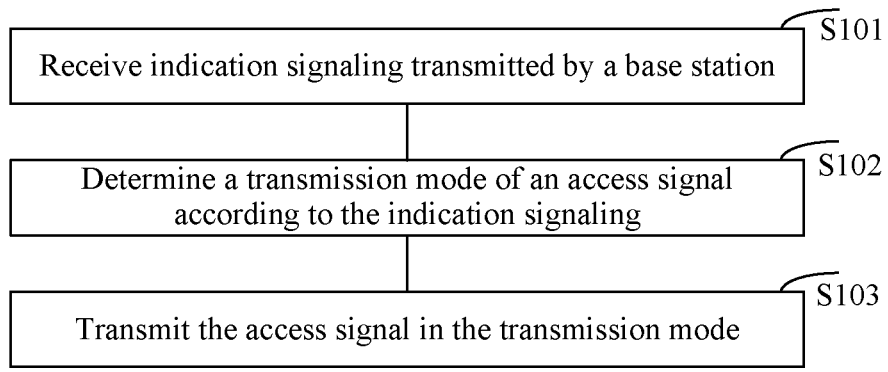
FIG. 1 is a flowchart of a radio access method according to an embodiment of the present invention.

FIG. 1 illustrates a radio access method according to an embodiment of the present invention. The method may be applied to a terminal in a high frequency communication system. The method includes the steps described below.

In step S101, indication signaling transmitted by a base station is received.

In step S102, a transmission mode of an access signal is determined according to the indication signaling.

The terminal determines that the transmission mode of the access signal to be transmitted includes N transmission modes, where N is greater than or equal to 1.

In step S103, the access signal is transmitted in the transmission mode.

It is to be noted that the indication signaling may include access manner notification signaling or a reference signal. In the above solution, the access signal transmissions in different transmission modes occupy different first access channel resources. For example, the first access channel resources occupied by the access signals transmitted in the different transmission modes may correspond to different times or periods, or the first access channel resources occupied by the access signals transmitted in the different transmission modes may correspond to different frequency domain resource segments, which is not described further for the sake of brevity in the embodiment.

In the above solution, the transmission mode includes a transmit beam and/or a transmit beam direction. The transmit beam direction may be a physical beam direction or a logical beam direction.

Furthermore, the step of determining the transmission mode of the access signal includes the step described below.

A baseband precoding matrix is determined and a baseband signal of the access signal is determined according to the baseband precoding matrix.

Alternatively, a radio frequency precoding matrix is determined and a radio frequency signal of the access signal is determined according to the radio frequency precoding matrix.

Alternatively, a transmit antenna pattern of the access signal is determined.

Alternatively, a transmit antenna port of the access signal is determined.

Alternatively, transmit power of the access signal is determined.

It is to be noted that the baseband precoding matrix is configured on a baseband-type access signal to be transmitted; the radio frequency precoding matrix is configured on a radio frequency-type access signal to be transmitted; and a transmit antenna is configured for the access signal to be transmitted. These processes may also generate the transmit beam.

In one embodiment, the step in which the transmission mode of the access signal is determined according to the indication signaling includes the step described below.

The transmission mode is determined according to the access manner notification signaling, or the transmission mode is determined by detecting the reference signal.

In an alternative specific implementation process, for the process of determining the transmission mode by detecting the reference signal, it is to be noted that the terminal may select an optimal downlink beam direction from the base station to the terminal according to the received reference signal, and then select the optimal downlink beam direction by based on the reciprocity between an uplink channel and a downlink channel in a TDD system as a selected beam direction for transmitting the access signal.

Specifically, the step in which the transmission mode is determined by detecting the reference signal includes the steps described below.

The reference signal is detected. The reference signal is transmitted in M transmission modes, where M is greater than or equal to 1.

N transmission modes are selected from the M transmission modes of the reference signal, where N is less than or equal to M.

N transmission modes of the access signal are determined at least according to the selected N transmission modes of the reference signal.

Specifically, the selected N transmission modes of the reference signal have a mapping relationship with the N transmission modes of the access signal so that the N transmission modes of the access signal may be determined according to the selected N transmission modes of the reference signal.

Alternatively, the selected N transmission modes of the reference signal are just the N transmission modes of the access signal.

Furthermore, the reference signal may be transmitted periodically by the base station and includes at least one of the following signals:

a base station-specific reference signal configured by the base station;

a dedicated demodulation reference signal configured by the base station;

a dedicated reference signal, configured by the base station, for the terminal to select the beam direction;

a dedicated reference signal, configured by the base station, for the terminal to select the transmission mode; and a downlink synchronization signal.

Exemplarily, in the above solution, when the access signal is not successfully transmitted, the method further includes the step described below.

The transmission mode of the access signal is re-determined according to the indication signaling and the access signal is transmitted using the re-determined transmission mode.

The number of access signal transmission failures is K, where K is greater than or equal to 1.

Furthermore, the access signal transmission failure includes failing to receiving an access response signal, or the received access response signal not carrying a response information corresponding to the access signal.

It is to be noted that the access response message is a message transmitted by the base station to respond to the access signal and may include response information for one or more access signals.

Specifically, the step in which the access signal is transmitted in the re-determined transmission mode specifically includes the step described below.

The access signal is retransmitted according to the same transmit power used in the last access signal transmission.

The access signal is retransmitted according to transmit power obtained with a preset power calculation formula.

It is to be noted that the preset power calculation formula may be determined according to the existing standards, which is not described for the sake of brevity in the embodiment.

In the above solution, access channel resources occupied by the access signal have a first mapping relationship with the transmission modes of the access signal. That is to say, the access signal transmitted in the different transmission modes occupies different access channel resources, and the base station can learn the transmission modes selected by the terminal by detecting the access channel resources where the access signal is located.

Alternatively, the access channel resources occupied by the access signal have a second mapping relationship with the transmission modes of the access signal. That is, different access channel resources may implicitly indicate the different transmission modes of the reference signal, and the base station can learn the transmission modes selected by the terminal by detecting the access channel resources where the access signal is located.

Alternatively, the access signal has a third mapping relationship with the transmission mode of the access signal. That is to say, the base station can learn the transmission mode selected by the terminal by identifying the access signal. That is, access signals are divided into one or more access signal sets and different access signal sets correspond to different access signal transmission modes.

Alternatively, the access signal has a fourth mapping relationship with a transmission mode of the reference signal. That is to say, the base station can learn the transmission mode selected by the terminal by identifying the access signal. That is, the access signals are divided into the one or more access signal sets and the different access signal sets correspond to the different transmission modes.

In the radio access method according to the embodiment, the terminal determines the transmission mode of the access signal according to the reference signal of the base station and transmits the access signal so that an access success rate in the high frequency communication system can be effectively increased.

Embodiment 2

Figure 2:
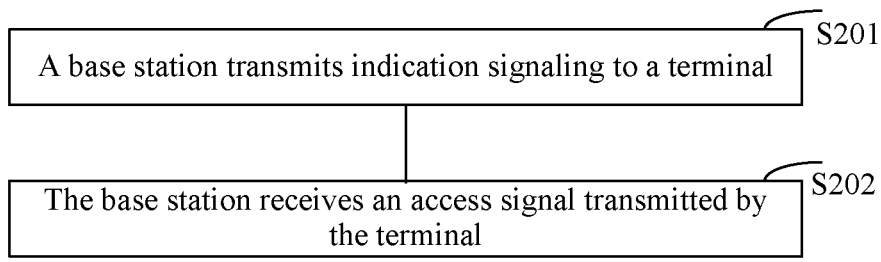
FIG. 2 is a flowchart of another radio access method according to an embodiment of the present invention.

Embodiment 2 is based on the same technical concept as the embodiment described above. FIG. 2 illustrates a radio access method according to an embodiment of the present disclosure. The method is applied to a base station in a high frequency communication system. The method includes the steps described below.

In step S201, the base station transmits indication signaling to a terminal.

In step S202, the base station receives an access signal transmitted by the terminal.

It is to be noted that the indication signaling may include access manner notification signaling or a reference signal.

In the above solution, the reference signal includes at least one of the following signals:

In the above solution, a transmission mode using which the base station transmits the reference signal to the terminal specifically includes:

a base station-specific reference signal configured by the base station;

a dedicated demodulation reference signal configured by the base station;

a dedicated reference signal, configured by the base station, for the terminal to select a beam direction;

a dedicated reference signal, configured by the base station, for the terminal to select a transmission mode; and a downlink synchronization signal.

In the above solution, a step in which the base station transmits an access response signal corresponding to the access signal to the terminal specifically includes the step described below.

The base station determines a transmission parameter of the access response signal according to the access channel resource occupied by the access signal transmission by the terminal or according to the access signal. The transmission parameter may include at least one of: a baseband precoding matrix, a radio frequency precoding matrix, an antenna port, a transmit beam, a transmit beam direction and transmit power.

Specifically, the base station may determine a baseband signal of the reference signal according to the baseband precoding matrix.

Alternatively, the base station may determine a radio frequency signal of the reference signal according to the radio frequency precoding matrix.

Alternatively, the base station may determine a transmit antenna port of the reference signal.

Alternatively, the base station may determine a transmit beam and/or a transmit beam direction of the reference signal.

Alternatively, the base station may determine transmit power of the reference signal.

Exemplarily, after the base station receives the access signal transmitted by the terminal, the method may further include that the base station transmits the access response message to the terminal. A transmission mode of the access response message is the same as a transmission mode of the reference signal in the indication signaling so that the terminal selects an optimal uplink beam direction within a specified range according to the access response message and transmits an uplink data message by using the selected optimal uplink beam direction.

Specifically, the access response message fed back by the base station is used for responding to the access signal transmitted by the terminal, and the base station determines the transmission mode of the access response message according to the set of access signals transmitted by the terminal and detected by the base station. The access response message includes at least one of the following:

indication information of a transmission mode of the uplink data message to be transmitted to the base station; where the uplink data message may be an Msg3 message for responding to the access response message transmitted by the base station;

indication information of an index of an access channel used by the terminal to transmit the access signal; where after receiving the indication message, the terminal transmits the Msg3 message in a transmission mode using which the access signal was transmitted on the indicated access channel; and indication information of an index of an access channel on which the access signal transmitted by the terminal has detected by the base station; where after receiving the indication message, the terminal transmits the Msg3 message in the transmission mode using which the access signal was transmitted on the indicated access channel.

It is to be noted that the access response message fed back by the base station is used for responding to the access signal transmitted by the terminal and the base station determines the transmission mode of the access response message according to the set of access channels transmitted by the terminal and detected by the base station.

In one embodiment, the set of access signals has a one-to-one mapping relationship with the transmission modes using which the base station transmits the reference signal to the terminal. That is to say, the base station may determine the transmission mode of a first reference signal selected by the terminal according to the set of detected access signals transmitted by the terminal, and then the base station transmits the first reference signal in a transmission mode same as the transmission mode using which the base station transmitted the access response message.

In the radio access method according to the embodiment, the base station transmits the reference signal to the terminal to enable the terminal to determine the transmission mode of the access signal according to the reference signal, so that the access success rate in the high frequency communication system can be effectively increased.

Embodiment 3

Figure 3:
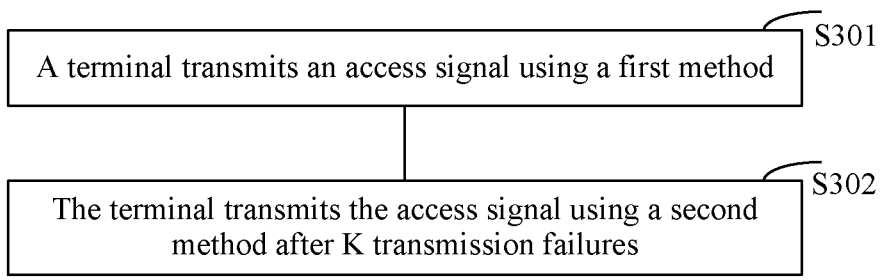
FIG. 3 is a flowchart of another radio access method according to an embodiment of the present invention.

FIG. 3 illustrates a radio access method according to an embodiment of the present disclosure. The method includes the steps described below.

In step S301, the terminal transmits an access signal using a first method.

In step S302, the terminal transmits the access signal by a second method after K transmission failures.

It is to be noted that the transmission failure of the access signal includes: the terminal not receiving a access response signal, or the received access response signal carrying a response information corresponding to the access signal.

In the technical solution illustrated in FIG. 3, the first method is any radio access method in the embodiment 1 and the second method is configured by the base station or determined by the terminal, and the first method is different from the second method. K is greater than or equal to 1.

Exemplarily, when the terminal transmits the access signal using the first method, the access signal occupies a first access channel resource.

When the terminal transmits the access signal using the second method, the access signal occupies a second access channel resource. The first access channel resource and the second access channel resource are configured by the base station.

Exemplarily, when the terminal transmits the access signal using the second method, a transmit antenna pattern of the terminal is an omnidirectional antenna pattern, that is, the transmitted access signal has no oriented beam direction.

For example, when the terminal transmits the access signal for the Kth time, if the terminal does not receive the access response signal, or the terminal receives the access response signal but the access response signal does not carry the response information corresponding to the access signal transmitted by the terminal, the terminal retransmits the access signal for the (K+1)th time in a transmission mode different from the transmission mode used in the Kth access signal transmission by the terminal.

In a specific example, in which K=5, the terminal retransmits the access signal at the 5th transmission, the terminal does not receive the access response signal or the terminal receives the access response signal but the access response signal does not carry the response information corresponding to the access signal transmitted by the terminal, the terminal retransmits the access signal in the 6th transmission in a transmission mode different from the transmission mode used in the 5th access signal transmission by the terminal.

It should be understood that the technical solution illustrated in FIG. 3 may be implemented separately or implemented as a preferred embodiment of the technical solution illustrated in FIG. 1.

Embodiment 4

Figure 4:
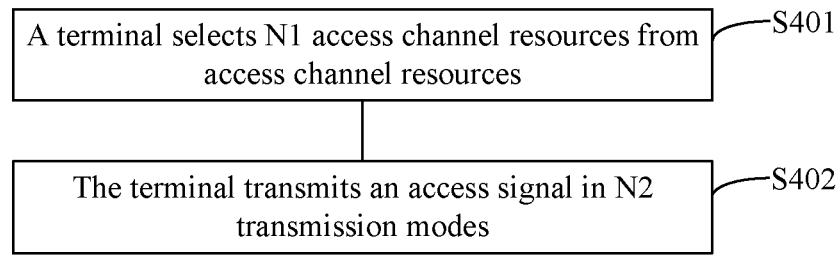
FIG. 4 is a flowchart of another radio access method according to an embodiment of the present invention.

FIG. 4 illustrates a radio access method according to an embodiment of the present disclosure. The method may include the steps described below.

In step S401, a terminal selects N1 access channel resources from access channel resources.

In step S402, the terminal transmits an access signal in N2 transmission modes.

It is to be noted that N1 is a positive integer and a value of N1 may be indicated by a configuration message sent by a base station to the terminal, but is not limited to this manner. N2 is also a positive integer and N2 is less than or equal to N1.

The N1 access channel resources mentioned here are channel resources occupied by one access signal transmission by the terminal. The N1 access channel resources occupy different resources in time domain. Alternatively, the resources occupied by the N1 access channel resources in the time domain do not overlap each other to avoid signal interference. For each of the N1 access channel resources, a transmission mode is employed for transmitting the access signal, and all the employed transmission modes are from the N2 transmission modes. In a most preferred solution, N1=N2, that is, the access signal is transmitted in different transmission modes on the access channel resources, and this random signal transmission manner is used to improve a signal access possibility.

Optionally, the access signal is transmitted in the N2 transmission modes each time within a preset number of transmissions; and after the preset number of transmissions, the access signal is transmitted in N3 transmission modes; where N3 is a positive integer, the N2 transmission modes are different from each other, and the N3 transmission modes are different from the N2 transmission modes.

Specifically, the N3 transmission modes are different from a part of the N2 transmission modes; or the N3 transmission modes are different from all of the N2 transmission modes.

The preset number of transmissions is configured by the base station or configured by default or configured by the terminal.

In one embodiment, both the N2 transmission modes and the N3 transmission modes are selected from a transmission mode set Q.

Here, transmission modes in the transmission mode set Q is configured by the base station or configured by default or determined by the terminal by detecting a reference signal.

The reference signal includes at least one of the following signals:

a base station-specific reference signal configured by the base station;

a dedicated demodulation reference signal configured by the base station;

a dedicated reference signal, configured by the base station, for the terminal to select a beam direction;

a dedicated reference signal, configured by the base station, for the terminal to select a transmission mode; and a downlink synchronization signal.

In one embodiment, after the preset number of transmissions, the N3 transmission modes are selected. When N3=1, the terminal transmits the access signal with an omnidirectional antenna pattern, that is, the access signal is not transmitted in direction oriented beam.

In another embodiment, after the preset number of transmissions, the N3 transmission modes are selected. When N2=1, only one access channel is selected to transmit the access signal.

Optionally, a step in which the terminal selects the N1 access channel resources from the access channel resources and transmits the access signal in the N2 transmission modes specifically includes the step described below.

The terminal selects an access signal set from P access signal sets, selects one access signal from the selected access signal set, and transmits the selected access signal on the select N1 access channel resources.

The P access signal sets have a one-to-one mapping relationship with transmission modes using which the base station transmits the reference signal to the terminal.

It is to be noted that each access signal set includes at least one access signal or at least one access signal index or at least one access sequence for access signal generation or at least one index of access sequence for the access signal generation. The P access signal sets may be configured by the base station. The one-to-one mapping relationship between the P access signal sets and the transmission modes of the reference signal transmitted by the base station to the terminal may be understood as follows. The terminal selects an optimal transmission mode of the reference signal by detecting the reference signal transmitted by the base station, selects one access signal from the access signal set corresponding to the selected transmission mode of the reference signal, and transmits the selected access signal on the access channel resource. Alternatively, by detecting the access signal selected by the terminal, the base station learns the access signal set to which the selected access signal belongs, and learns the optimal transmission mode of the reference signal for the terminal side according to the access signal set.

Alternatively, the method in the present embodiment may further include that the terminal receives an access response message transmitted by the base station. It is to be noted that the access response message fed back by the base station is used for responding to the access signal transmitted by the terminal, and the base station determines a transmission mode of the access response message according to the access signal set to which the detected access signal transmitted by the terminal belongs.

Preferably, a transmission mode of the access response message transmitted by the base station is the same as the transmission mode of the reference signal corresponding to the access signal set to which the access signal selected by the terminal belongs.

The access response message may include, but is not limited to, at least one of the following:

indication information of a transmission mode using which an uplink data message is transmitted to the base station; where the uplink data message may be an Msg3 message for responding to the access response message transmitted by the base station;

indication information of an index of an access channel used by the terminal to transmit the access signal; where after receiving this indication information, the terminal transmits uplink data or an uplink message such as the Msg3 message in the transmission mode using which the access signal was transmitted on the indicated access channel; and indication information of an index of an access channel on which the access signal transmitted by the terminal is detected by the base station; where after receiving the indication information, the terminal transmits the uplink data or the uplink message such as the Msg3 message in the transmission mode using which the access signal was transmitted on the indicated access channel.

Embodiment 5

Figure 5:
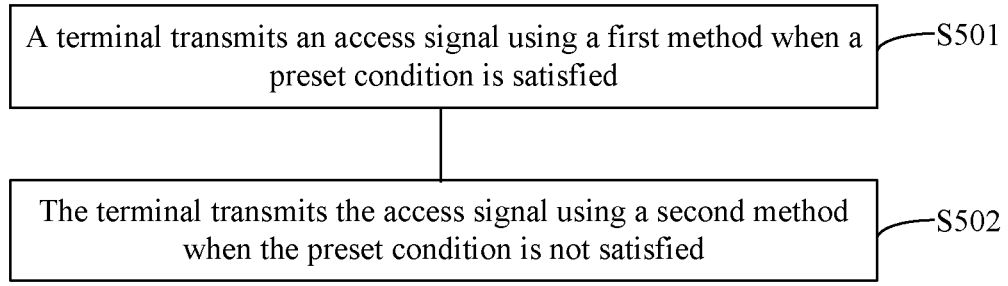
FIG. 5 is a flowchart of another radio access method according to an embodiment of the present invention.

FIG. 5 illustrates a radio access method according to an embodiment of the present disclosure. The method may include the steps described below.

In step S501, a terminal transmits an access signal using a first method when a preset condition is satisfied.

In step S502, the terminal transmits the access signal using a second method when the preset condition is not satisfied.

It is to be noted that the first method or the second method may be any radio access method in the embodiments described above and the first method is different from the second method.

Exemplarily, the preset condition is that an uplink channel and a downlink channel have reciprocity.

In a radio system including a base station and the terminal, a channel used by the base station to transmit a signal to the terminal is referred to as the downlink channel and a channel used by the terminal to transmit a signal to the base station is referred to as the uplink channel.

Furthermore, the reciprocity includes at least the following: the uplink channel and the downlink channel adopt a TDD mode;

a channel characteristic of the signal transmission by the base station has reciprocity with a channel characteristic of the signal reception by the base station, and a channel characteristic of the signal transmission by the terminal has reciprocity with a channel characteristic of the signal reception by the terminal; and an antenna port used by the base station for signal transmission is the same as an antenna port used by the base station for signal reception, and an antenna port used by the terminal for signal transmission is the same as an antenna port used by the terminal for signal reception.

It is to be noted that that the antenna port used by the base station to transmit the signal is the same as the antenna port used by the base station to receive the signal may be understood as that the channel characteristic for the base station to transmit the signal has reciprocity with the channel characteristic for the base station to receive the signal; and that the antenna port used by the terminal to transmit the signal is the same as the antenna port used by the terminal to receive the signal may also be understood as that the channel characteristic for the terminal to transmit the signal has reciprocity with the channel characteristic for the terminal to receive the signal.

Exemplarily, when the terminal transmits the access signal using the first method, the terminal occupies a first access channel resource to transmit the access signal to the base station.

When the terminal transmits the access signal using the second method, the terminal occupies a second access channel resource to transmit the access signal to the base station. It is to be noted that the first access channel resource and the second access channel resource are configured by the base station. Preferably, the first access channel resource and the second access channel resource may occupy different frequency resources in frequency domain.

It should be understood that occupying different frequency resources may refer to that frequency domain resources occupied by the access channels are different, alternatively may refer to that frequency resources occupied by the access channels do not overlap each other.

Preferably, the technical solution illustrated in FIG. 5 may be implemented separately or implemented as a preferred embodiment of the technical solution illustrated in FIG. 1.

Embodiment 6

Embodiment 6 is based on the same technical concepts as the embodiments described above. The technical solutions in the embodiments described above are illustrated through specific embodiments in the preset embodiment.

Specific Embodiment 1

Figure 6:
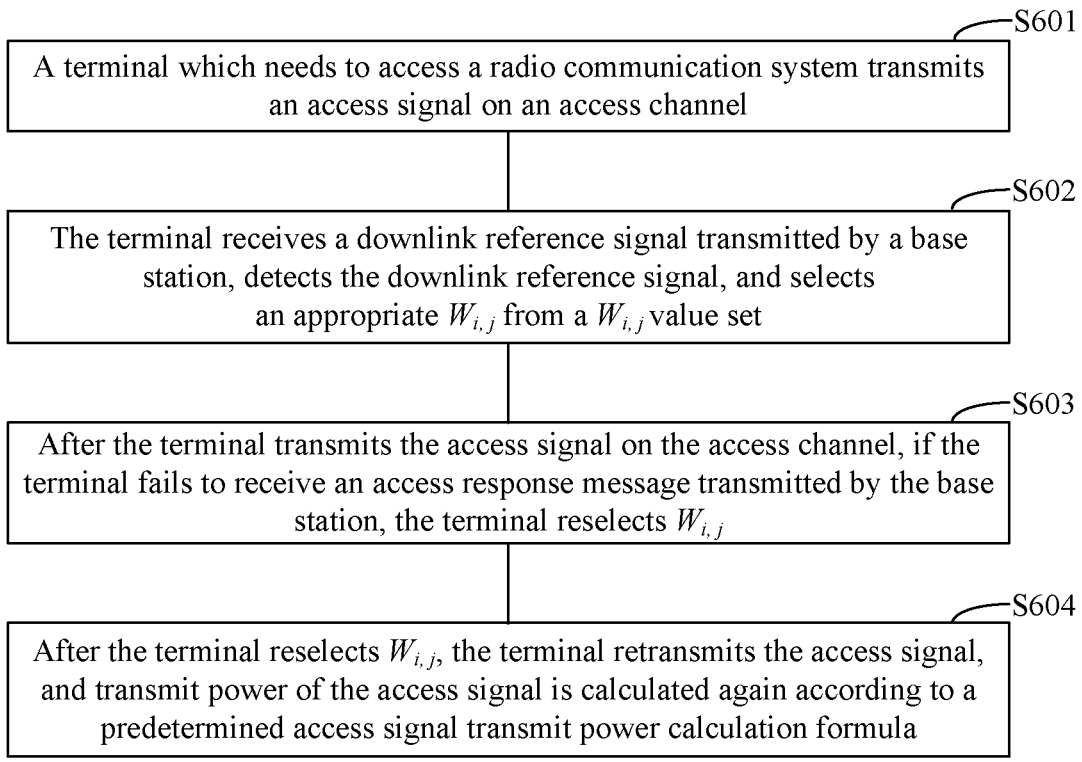
FIG. 6 is a flowchart of a specific embodiment 1 of the present invention.

In a radio communication system, a process in the specific embodiment, as shown in FIG. 6, may include the steps described below.

In step S601, a terminal which needs to access the radio communication system transmits an access signal on an access channel.

It is to be noted that the access channel occupied by the terminal to transmit the access signal may include J transmission symbols, and each transmission symbol includes I subcarriers. Therefore, a transmission mode of the access signal transmitted on an ith subcarrier in a jth transmission symbol is $X_{i,j}=W_{i,j}s_{i,j}$, where $1\le i\le I$ and $1\le j\le J$. $s_{i,j}$ denotes a baseband signal transmitted on the ith subcarrier in the jth transmission symbol after an access sequence selected by the terminal is processed according to standards, $W_{i,j}$ is a precoding matrix, $W_{i,j}$ is selected by the terminal from a $W_{i,j}$ value set, and the $W_{i,j}$ value set is configured by a base station or stored in the base station and the terminal as a default configuration.

Understandably, the $W_{i,j}$ value set is a set of multiple beam direction matrices in one space.

In step S602, the terminal receives a downlink reference signal transmitted by the base station, detects the downlink reference signal, and selects an appropriate $W_{i,j}$ from the $W_{i,j}$ value set.

The downlink reference signal includes at least one of the following signals:

a sector-specific downlink reference signal configured by the base station; and a dedicated reference signal, configured by the base station, for the terminal to select $W_{i,j}$.

It is to be noted that an access channel resource occupied by the terminal to transmit the access signal has a mapping relationship with $W_{i,j}$ selected by the terminal, that is, different access channel resources correspond to different $W_{i,j}$.

Alternatively, the access signal $s_{i,j}$ transmitted by the terminal has a mapping relationship with $W_{i,j}$ selected by the terminal, that is, different access signals $s_{i,j}$ correspond to different $W_{i,j}$ or different access signal $s_{i,j}$ sets correspond to different $W_{i,j}$.

In step S603, after the terminal transmits the access signal on the access channel, if the terminal fails to receive an access response message transmitted by the base station, the terminal reselects $W_{i,j}$.

That is to say, the terminal needs to receive the downlink reference signal again, detects the downlink reference signal, and reselects the appropriate $W_{i,j}$ from the $W_{i,j}$ value set.

The access response message is a message transmitted by the base station for responding to the access signal.

In step S604, after the terminal reselects $W_{i,j}$, the terminal retransmits the access signal, and transmit power of the access signal is calculated again according to a predetermined access signal transmit power calculation formula.

Specific Embodiment 2

Figure 7:
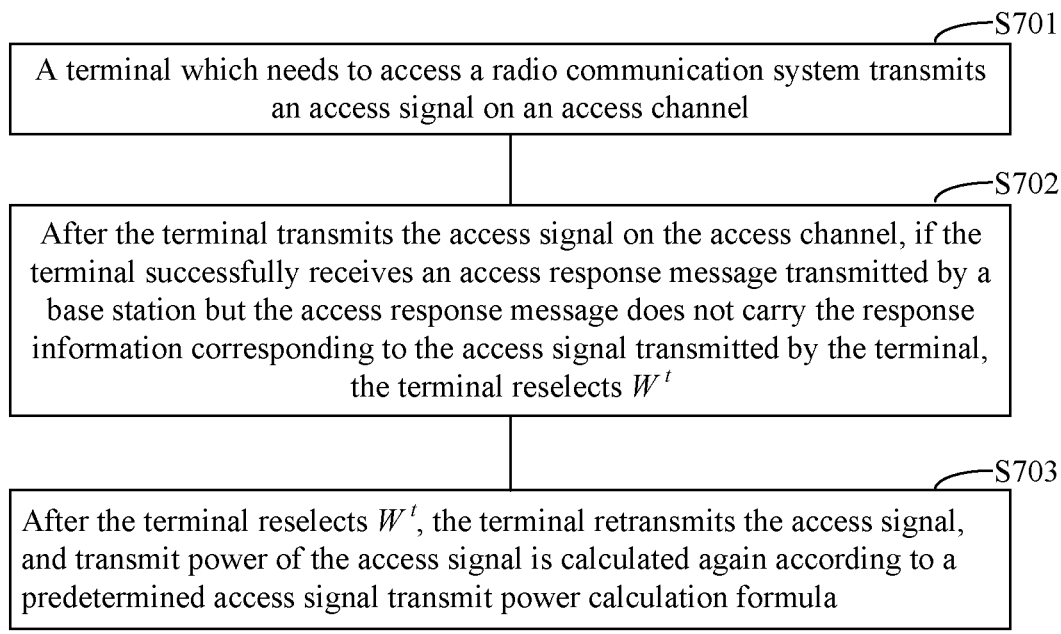
FIG. 7 is a flowchart of a specific embodiment 2 of the present invention.

Referring to FIG. 7, in a time division duplex (TDD) radio communication system, the method includes steps below.

In step S701, a terminal which needs to access the radio communication system transmits an access signal on an access channel.

It is to be noted that a signal to be transmitted by the terminal on an nth antenna port at a time t is $s_n$. The number of antenna ports configured by the terminal is N and indexes of the antenna ports are $Tx_1 \sim Tx_N$. Signals to be transmitted by the terminal on N antenna ports at the time t are $S^t=[s_1, s_2, \ldots, s_N]^T$.

Before $S^t$ are transmitted, configuration parameters of the N antenna ports need to be adjusted for adjusting transmission phases, and the adjusted parameter may be a radio frequency precoding matrix, which is specifically $W^t=[w_1, w_2, \ldots, w_N]^T$. The signals transmitted at radio frequency ends of the N antenna ports at the time t are $X^t=[w_1 s_1, w_2 s_2, \ldots, w_N s_N]^T$.

Specifically, $W^t$ is selected according to the steps described below.

The terminal receives reference signals transmitted by a base station before transmitting the access signal. The reference signals occupy K time-frequency resource blocks, and signals transmitted by the base station on different time-frequency resource blocks have different physical downlink beam directions.

The terminal detects the reference signals and selects an optimal downlink beam direction from the base station to the terminal according to a predefined rule.

Considering a reciprocity principle between an uplink and a downlink in the TDD system, the above selected optimal downlink beam direction is a beam direction selected by the terminal to transmit the access signal.

The terminal adjusts values of variables in $W^t=[w_1, w_2, \ldots, w_N]^T$ so that the signals $X^t=[w_1 s_1, w_2 s_2, \ldots, w_N s_N]^T$ transmitted at the radio frequency ends of the N antenna ports at the time t have the above beam direction.

Alternatively, the terminal selects an appropriate $W^t=[w_1, w_2, \ldots, w_N]^T$ from a $W^t$ value set, so that the signals $X^t=[w_1 s_1, w_2 s_2, \ldots w_N s_N]^T$ transmitted at the radio frequency ends of the N antenna ports at the time t have the above beam direction or the beam direction of the signals has a minimum deviation from the above beam direction. The $W^t$ value set is configured by the base station or as a default baseband precoding matrix stored in the base station and the terminal.

Specifically, the reference signal transmitted by the base station includes at least one of the following signals:

a sector-specific downlink reference signal configured by the base station; and a dedicated reference signal, configured by the base station, for the terminal to select $W^t$.

It is to be noted that access channel resources occupied by the terminal to transmit the access signal have a mapping relationship with $W^t$ selected by the terminal, that is, different access channel resources correspond to different $W^t$.

Alternatively, the access signals transmitted by the terminal have a mapping relationship with $W^t$ selected by the terminal, that is, different access signals correspond to different $W^t$.

In step S702, after the terminal transmits the access signal on the access channel, if the terminal successfully receives an access response message transmitted by the base station but the access response message carries no response information corresponding to the access signal transmitted by the terminal, the terminal reselects $W^t$, that is, the terminal needs to receive the downlink reference signal again, detects the downlink reference signal, and reselects the appropriate $W^t$ from the $W^t$ value set.

The access response message is a message transmitted by the base station for responding to the access signal.

In step S703, after the terminal reselects $W^t$, the terminal retransmits the access signal, and transmit power of the access signal is calculated again according to a predetermined access signal transmit power calculation formula.

Specific Embodiment 3

Figure 8:
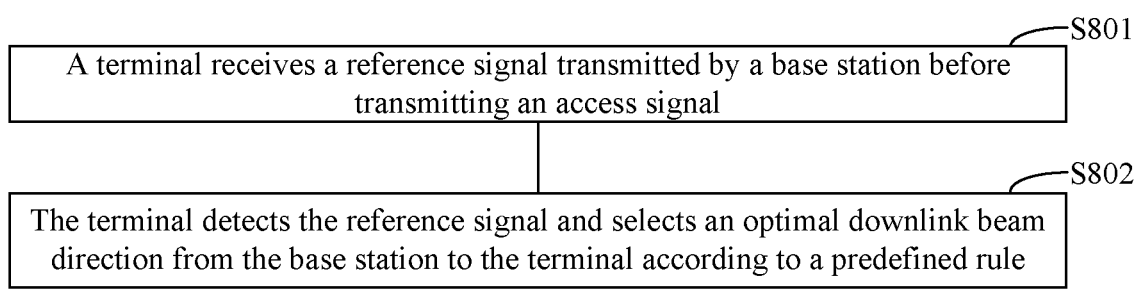
FIG. 8 is a flowchart of a specific embodiment 3 of the present invention.

Referring to FIG. 8, in a time division duplex (TDD) radio communication system, the steps below may be included.

In step S801, a terminal receives a reference signal transmitted by a base station before transmitting an access signal.

The reference signal occupies K time-frequency resource blocks, and signals transmitted by the base station on different time-frequency resource blocks have different physical downlink beam directions.

In step S802, the terminal detects the reference signal and selects an optimal downlink beam direction from the base station to the terminal according to a predefined rule.

Considering a reciprocity principle between an uplink and a downlink in the TDD system, the above selected optimal downlink beam direction is a beam direction selected by the terminal to transmit the access signal.

The reference signal transmitted by the base station includes at least one of the following signals:

a sector-specific downlink reference signal configured by the base station; and a dedicated reference signal, configured by the base station, for the terminal to select a beam.

The access channel occupied by the terminal to transmit the access signal includes J transmission symbols, and each transmission symbol includes I subcarriers. Therefore, the access signal transmitted on an ith subcarrier in a jth transmission symbol is $s_{i,j}$, where $1 \cdot i \leq I$ and $1 \leq j \leq J$. In the present embodiment, a predefined change is performed on $s_{i,j}$ to obtain $x_{t,n}$ (the predefined change function is $x_{t,n} = f(s_{i,j})$) and the transmission expression of the final access signal is $x_{t,n}$ (where t is a transmission time, n is an index of a transmit antenna port, $1 \leq n \leq N$ and N is the number of antenna ports occupied by the access signal transmission by the terminal), so that $X_t = [x_{t,1}, x_{t,2}, \ldots, x_{t,N}]^T$ is consistent with the beam direction selected by the terminal or has a minimum deviation from the beam direction selected by the terminal.

The predefined change function $x_{t,n} = f(s_{i,j})$ includes at least one of the functions described below.

A precoding matrix $W_{i,j}$ is applied to the access signal $s_{i,j}$ using a method $W_{i,j} s_{i,j}$.

Alternatively, N transmit antenna ports are selected for transmitting the access signal.

Alternatively, configuration parameters of the N transmit antenna ports selected for transmitting the access signal are adjusted, for example, phases of the N transmit antenna ports are adjusted.

Alternatively, transmit power is configured for transmitting the access signal.

Understandably, access channel resources occupied by the terminal to transmit the access signal have a mapping relationship with the beam directions selected by the terminal, that is, different access channel resources correspond to different beam directions.

Alternatively, the access signals transmitted by the terminal have a mapping relationship with the beam directions selected by the terminal, that is, different access signals or access signal sets correspond to different beam directions.

Specific Embodiment 4

In a TDD radio communication system, there are two types of terminals which are respectively defined as a first-type terminal and a second-type terminal. The system allocates different access channel resources for the two types of terminal.

The first-type terminal transmits an access signal in a flow described below.

The first-type terminal transmits the access signal on an access channel.

It is to be noted that the first-type terminal receives a reference signal transmitted by a base station before transmitting the access signal. The reference signal occupies K time-frequency resource blocks, and signals transmitted by the base station on different time-frequency resource blocks have different physical downlink beam directions.

The first-type terminal detects the reference signal and selects an optimal downlink beam direction from the base station to the first-type terminal according to a predefined rule. Considering a reciprocity principle between an uplink and a downlink in the TDD system, the selected optimal downlink beam direction is a beam direction selected by the first-type terminal to transmit the access signal.

The reference signal transmitted by the base station includes at least one of the following signals:

a sector-specific downlink reference signal configured by the base station; and a dedicated reference signal, configured by the base station, for the first-type terminal to select $W^t$.

It is further to be noted that the access channel occupied by the first-type terminal to transmit the access signal includes J transmission symbols, and each transmission symbol includes I subcarriers. Therefore, the access signal transmitted on an ith subcarrier in a jth transmission symbol is $s_{i,j}$, where $1 \leq i \leq I$ and $1 \leq j \leq J$. In the embodiment, a predefined change is performed on $s_{i,j}$ to obtain $x_{t,n}$ (the predefined change function is $x_{t,n} = f(s_{i,j})$) and the final transmission expression of the access signal is $x_{t,n}$ (where t is a transmission time, n is an index of a transmit antenna port, $1 \leq n \leq N$, and N is a number of antenna ports occupied by the first-type terminal to transmit the access signal), so that $X_t = [x_{t,1}, x_{t,2}, \ldots, x_{t,N}]^T$ is consistent with the beam direction selected by the first-type terminal or has a minimum deviation from the beam direction selected by the first-type terminal.

It is to be noted that the predefined change function $x_{t,n} = f(s_{i,j})$ includes at least one of the functions described below.

A precoding matrix $W_{i,j}$ is applied to the access signal $s_{i,j}$ using a method $W_{i,j} s_{i,j}$.

Alternatively, N transmit antenna ports are selected for transmitting the access signal.

Alternatively, configuration parameters of the N transmit antenna ports selected for transmitting the access signal are adjusted, for example, phases of the N transmit antenna ports are adjusted.

Alternatively, transmit power is configured for transmitting the access signal.

Understandably, access channel resources occupied by the first-type terminal to transmit the access signal have a mapping relationship with the beam directions selected by the first-type terminal, that is, different access channel resources correspond to different beam directions.

Alternatively, the access signals transmitted by the first-type terminal have a mapping relationship with the beam directions selected by the first-type terminal, that is, different access signals or access signal sets correspond to different beam directions.

Accordingly, the second-type terminal transmits the access signal in a flow described below.

The second-type terminal transmits the access signal by using an omnidirectional antenna. Before transmitting the access signal, the second-type terminal does not need to select the beam direction for transmitting the access signal by detecting the reference signal transmitted by the base station.

Specific Embodiment 5

Corresponding to the above two types of terminals, it is to be noted that there are two schemes for transmitting an access signal in a TDD radio communication system, which are respectively defined as a first scheme and a second scheme. The system allocates different access channel resources for the first scheme and the second scheme.

A terminal which selects the first scheme transmits an access signal in a flow described below.

The terminal which needs to access the radio communication system transmits the access signal on an access channel.

It is to be noted that the terminal receives a reference signal transmitted by a base station before transmitting the access signal. The reference signal occupies K time-frequency resource blocks, and signals transmitted by the base station on different time-frequency resource blocks have different physical downlink beam directions.

The terminal detects the reference signal and selects an optimal downlink beam direction from the base station to the terminal according to a predefined rule. Considering a reciprocity principle between an uplink and a downlink in the TDD system, the selected optimal downlink beam direction is a beam direction selected by the terminal to transmit the access signal.

The reference signal transmitted by the base station includes at least one of the following signals:

a sector-specific downlink reference signal configured by the base station; and a dedicated reference signal, configured by the base station, for the terminal to select $W^t$.

It is further to be noted that the access channels occupied by the terminal to transmit the access signal include J transmission symbols, and each transmission symbol includes I subcarriers. Therefore, the access signal transmitted on an ith subcarrier in a jth transmission symbol is $s_{i,j}$, where $1 \leq i \leq I$ and $1 \leq j \leq J$. In the present embodiment, a predefined change is performed on $s_{i,j}$ to obtain $x_{t,n}$ (a predefined change function is $x_{t,n}=f(s_{i,j})$) and the final transmission expression of the access signal is $x_{t,n}$ (where t is a transmission time, n is an index of a transmit antenna port, $1 \leq n \leq N$ and N is the number of antenna ports occupied by the terminal to transmit the access signal), so that $X_t = [x_{t,1}, x_{t,2}, \ldots, x_{t,N}]^T$ is consistent with the beam direction selected by the terminal or has a minimum deviation from the beam direction selected by the terminal.

The predefined change function $x_{t,n}=f(s_{i,j})$ includes at least one of the functions described below.

A precoding matrix $W_{i,j}$ is applied to the access signal $s_{i,j}$, by a method of $W_{i,j}s_{i,j}$.

Alternatively, N transmit antenna ports are selected for the access signal transmission.

Alternatively, configuration parameters of the N transmit antenna ports selected for the access signal transmission are adjusted, for example, phases of the N transmit antenna ports are adjusted.

Alternatively, transmit power is configured for the access signal transmission.

Understandably, access channel resources occupied by the terminal to transmit the access signal have a mapping relationship with the beam directions $W^t$ selected by the terminal, that is, different access channel resources correspond to different beam directions $W^t$.

Alternatively, the access signals transmitted by the terminal have a mapping relationship with the beam directions $W^t$ selected by the terminal, that is, different access signals or access signal sets correspond to different beam directions $W^t$.

Accordingly, a terminal which selects the second scheme transmits the access signal in a flow described below.

The terminal transmits the access signal by using an omnidirectional antenna. Before transmitting the access signal, the terminal does not need to select the beam direction for the access signal transmission by detecting the reference signal transmitted by the base station.

Embodiment 7

Figure 9:
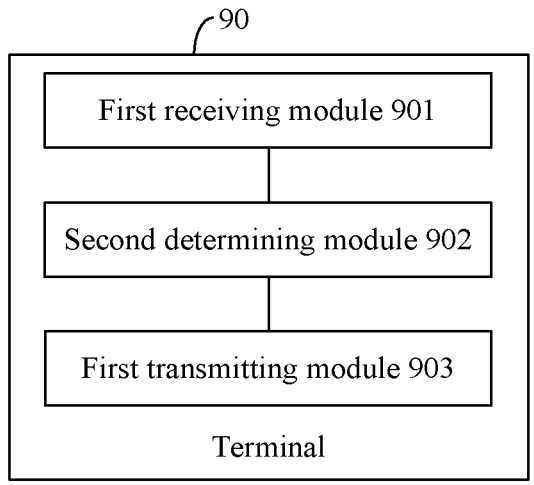
FIG. 9 is a structural diagram of a terminal in a high frequency communication system according to an embodiment of the present invention.

Embodiment 7 is based on the same technical concepts as the embodiments described above. FIG. 9 illustrates a terminal 90 according to an embodiment of the present disclosure. The terminal 90 may include a first receiving module 901, a first determining module 902 and a first transmitting module 903.

The first receiving module 901 is configured to receive indication signaling transmitted by a base station.

The first determining module 902 is configured to determine a transmission mode of an access signal according to the indication signaling.

The first transmitting module 903 is configured to transmit the access signal in the transmission mode.

In the above solution, the indication signaling includes access manner notification signaling or a reference signal.

In the above solution, the transmission mode includes a transmit beam and/or a transmit beam direction.

In the above solution, the first determining module 902 is specifically configured to:

determine the transmission mode according to the access manner notification signaling, or determine the transmission mode by detecting the reference signal.

In the above solution, the first determining module 902 is specifically configured to:

determine a baseband precoding matrix and determine a baseband signal of the access signal according to the baseband precoding matrix;

alternatively, determine a radio frequency precoding matrix and determine a radio frequency signal of the access signal according to the radio frequency precoding matrix;

alternatively, determine a transmit antenna pattern of the access signal;

alternatively, determine a transmit antenna port of the access signal;

alternatively, determine transmit power of the access signal.

In the above solution, the first determining module 902 is specifically configured to:

detect the reference signal, where the reference signal is transmitted in M transmission modes, where M is greater than or equal to 1;

select N transmission modes from the M transmission modes of the reference signal, where N is less than or equal to M; and determine N transmission modes of the access signal at least according to the selected N transmission modes of the reference signal.

In the above solution, the reference signal includes at least one of the following signals:

a base station-specific reference signal configured by the base station;

a dedicated demodulation reference signal configured by the base station;

a dedicated reference signal, configured by the base station, for the terminal to select a beam direction;

a dedicated reference signal, configured by the base station, for the terminal to select a transmission mode; and a downlink synchronization signal.

Figure 10:
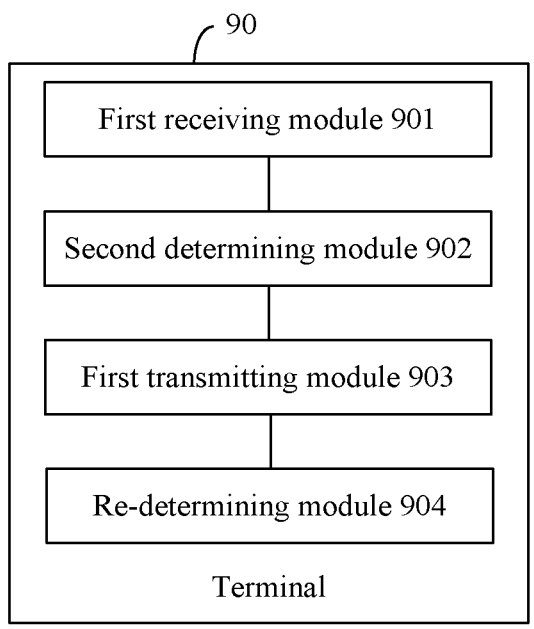
FIG. 10 is a structural diagram of another terminal in a high frequency communication system according to an embodiment of the present invention.

In the above solution, referring to FIG. 10, the terminal 90 further includes a re-determining module 904. The re-determining module 904 is configured to re-determine the transmission mode of the access signal according to the indication signaling in response to an access signal transmission failure.

Accordingly, the first transmitting module 903 is further configured to transmit the access signal in the re-determined transmission mode.

The number of access signal transmission failures is K, where K is greater than or equal to 1.

In the above solution, the access signal transmission failure includes failing to receiving an access response signal, or the received access response signal not carrying response information corresponding to the access signal.

In the above solution, access channel resources occupied by the access signal have a first mapping relationship with the transmission modes of the access signal.

Alternatively, the access channel resources occupied by the access signal have a second mapping relationship with the transmission modes of the reference signal.

Alternatively, the access signal has a third mapping relationship with the transmission modes of the access signal.

Alternatively, the access signal has a fourth mapping relationship with the transmission modes of the reference signal.

In practical applications, the first receiving module 901 and the first transmitting module 903 may be implemented by a transceiver in the terminal 90; and the first determining module 902 and a re-determining module 904 may be implemented by a central processing unit (CPU), a micro control unit (MCU), a digital signal processor (DSP) or a field-programmable gate array (FPGA) in the terminal 90.

Embodiment 8

Figure 11:
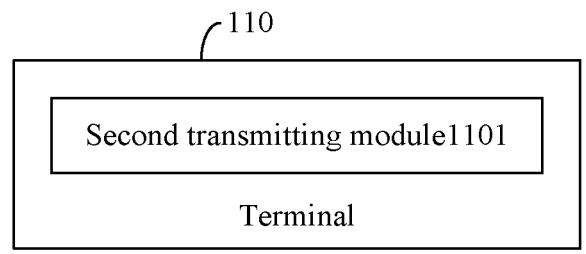
FIG. 11 is a structural diagram of another terminal in a high frequency communication system according to an embodiment of the present invention.

Embodiment 8 is based on the same technical concepts as the embodiments described above. FIG. 11 illustrates a terminal 110 according to an embodiment of the present disclosure. The terminal 110 includes a second transmitting module 1101. The second transmitting module 1101 is configured to transmit an access signal using a first method and transmit the access signal using a second method after K access signal transmission failures.

The first method is the radio access method in the embodiment 1. The second method is configured by a base station or determined by the terminal. The first method is different from the second method. K is greater than or equal to 1.

In the above solution, when the second transmitting module 1101 transmits the access signal using the first method, the access signal occupies a first access channel resource.

When the second transmitting module 1101 transmits the access signal using the second method, the access signal occupies a second access channel resource. The first access channel resource and the second access channel resource are configured by the base station.

When the second transmitting module 1101 transmits the access signal using the second method, a transmit antenna pattern of the second transmitting module 1101 is an omni-directional antenna pattern.

In practical applications, the second transmitting module 1101 may be implemented by a transceiver in the terminal 110.

Embodiment 9

Figure 12:
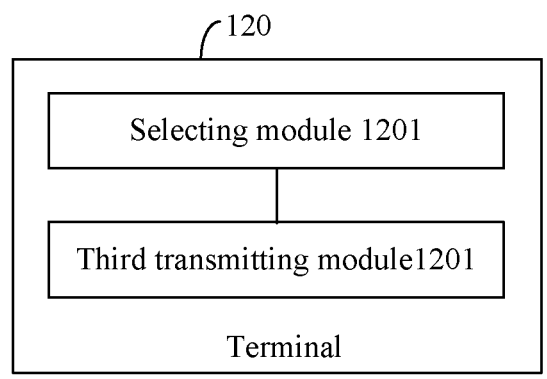
FIG. 12 is a structural diagram of another terminal in a high frequency communication system according to an embodiment of the present invention.

Embodiment 9 is based on the same technical concepts as the embodiments described above. FIG. 12 illustrates a terminal 120 according to an embodiment of the present disclosure. The terminal 120 includes a selecting module 1201 and a third transmitting module 1202. The selecting module 1201 is configured to select N1 access channel resources from access channel resources.

The third transmitting module 1202 is configured to transmit an access signal in N2 transmission modes, where N1 is a positive integer and N2 is a positive integer less than or equal to N1.

In the above solution, the third transmitting module 1202 is configured to transmit the access signal in the N2 transmission modes each time within a preset number of transmissions, and transmit the access signal in N3 transmission modes after the preset number of transmissions, where N3 is a positive integer, and the N3 transmission modes are different from the N2 transmission modes.

In the above solution, the selecting module 1201 is configured to select an access signal set from P access signal sets and select an access signal from the selected access signal set.

The third transmitting module 1202 is configured to transmit the selected access signal on the selected N1 access channel resources.

The P access signal sets have a one-to-one mapping relationship with the transmission mode of a reference signal transmitted by a base station to the terminal.

In the above solution, the terminal further includes a second receiving module. The second receiving module is configured to receive an access response message transmitted by the base station.

In the above solution, the transmission mode of the access response message transmitted by the base station is the same as the transmission mode of the reference signal corresponding to the access signal set to which the access signal selected by the terminal belongs.

In the above solution, the access response message includes at least one of the following: indication information of a transmission mode of an uplink data message transmitted to the base station;

indication information of an index of an access channel used by the terminal to transmit the access signal; and indication information of an index of an access channel on which the access signal transmitted by the terminal has been detected by the base station.

In practical applications, the selecting module 1201 may be implemented by a CPU, an MCU, a DSP or an FPGA in the terminal 120; and the third transmitting module 1202 may be implemented by a transceiver in the terminal 120.

Embodiment 10

Figure 13:
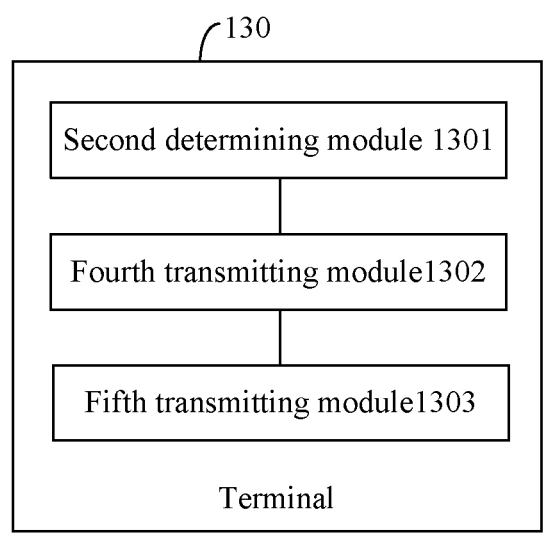
FIG. 13 is a structural diagram of another terminal in a high frequency communication system according to an embodiment of the present invention.

Embodiment 10 is based on the same technical concepts as the embodiments described above. FIG. 13 illustrates a structure of a terminal 130 according to an embodiment of the present disclosure. The terminal 130 may include:

a second determining module 1301, a fourth transmitting module 1302 and a fifth transmitting module 1303.

The second determining module 1301 is configured to determine whether a preset condition is satisfied.

The second determining module 1301 triggers the fourth transmitting module 1302 when the preset condition is satisfied.

The second determining module 1301 triggers the fifth transmitting module 1303 when the preset condition is not satisfied.

The fourth transmitting module 1302 is configured to transmit an access signal using a first method.

The fifth transmitting module 1303 is configured to transmit the access signal using a second method.

The first method or the second method may be any radio access method in the embodiments described above and the first method is different from the second method.

In the above solution, the preset condition is that an uplink channel and a downlink channel have reciprocity.

In the above solution, the reciprocity includes at least the following: the uplink channel and the downlink channel adopt a TDD mode;

a channel characteristic of the signal transmission by the base station has reciprocity with a channel characteristic of the signal reception of the base station, and a channel characteristic of the signal transmission by the terminal 130 has reciprocity with a channel characteristic of the signal reception by the terminal 130; and an antenna port used by the base station for signal transmission is the same as an antenna port used by the base station for signal reception, and an antenna port used by the terminal 130 for signal transmission is the same as an antenna port used by the terminal 130 for signal reception.

In the above solution, when the fourth transmitting module 1302 transmits the access signal using the first method, the access signal occupies a first access channel resource.

When the fifth transmitting module 1303 transmits the access signal using the second method, the access signal occupies a second access channel resource, where the first access channel resource and the second access channel resource are configured by the base station.

In practical applications, the second determining module 1301 may be implemented by a CPU, an MCU, a DSP or an FPGA in the terminal 130, and the fourth transmitting module 1302 and the fifth transmitting module 1303 may be implemented by a transceiver in the terminal 130.

Embodiment 11

Figure 14:
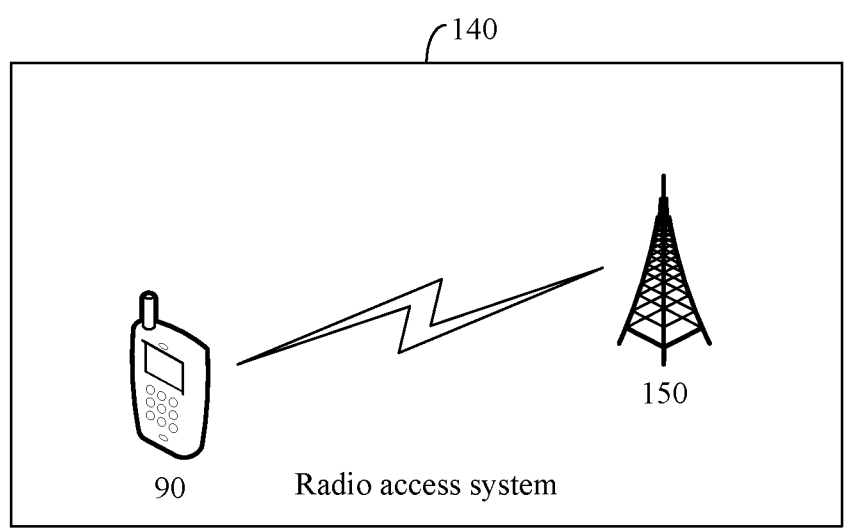
FIG. 14 is a structural diagram of a radio access system according to an embodiment of the present invention.

Embodiment 11 is based on the same technical concepts as the embodiments described above. FIG. 14 illustrates a radio access system 140 according to an embodiment of the present disclosure. The system 140 includes a terminal 90 and a base station 150 in a high frequency communication system.

The terminal 90 is configured to: receive indication signaling transmitted by the base station 150;

determine a transmission mode of an access signal according to the indication signaling; and transmit the access signal in the transmission mode.

The base station 150 is configured to transmit the indication signaling to the terminal 90.

The base station 150 is further configured to receive the access signal transmitted by the terminal 90.

It is to be understood by those skilled in the art that the embodiments of the present disclosure can provide a method, a system or a computer program product. Therefore, the present disclosure may adopt a mode of a hardware embodiment, a software embodiment or a combination of hardware and software embodiments. In addition, the present disclosure may adopt a form of a computer program product implemented on one or more computer-usable storage media (which include, but are not limited to, a disk memory, an optical memory and the like) which include computer-usable program codes.

The present disclosure is described with reference to flowcharts and/or block diagrams of methods, devices (systems) and computer program products according to the embodiments of the present disclosure. It should be understood that computer program instructions may implement each flow and/or block in the flowcharts and/or block diagrams and a combination of flows and/or blocks in the flowcharts and/or block diagrams. These computer program instructions may be provided to a general-purpose computer, a special-purpose computer, an embedded processor or a processor of another programmable data processing device to produce a machine so that instructions executed by a computer or the processor of other programmable data processing device produce the apparatus for implementing functions designated in one or more flows in the flowcharts and/or one or more blocks in the block diagrams.

These computer program instructions may also be stored in a computer-readable memory which can cause the computer or other programmable data processing device to operate in a particular manner so that the instructions stored in the computer-readable memory produce a manufactured product including an instructing apparatus. The instructing apparatus implements the functions designated in the one or more flows in the flowcharts and/or the one or more blocks in the block diagrams.

These computer program instructions may also be loaded onto the computer or another programmable data processing device so that a series of operations and steps are performed on the computer or another programmable device to produce processing implemented by the computer. Therefore, instructions executed on the computer or another programmable device provide steps for implementing the functions designated in the one or more flows in the flowcharts and/or the one or more blocks in the block diagrams.

Based on this, an embodiment of the present disclosure further provides a computer storage medium, including a set of instructions. When the set of instructions are executed, at least one processor is caused to execute the radio access method according to any of the embodiments described above.

The above are only preferred embodiments of the present disclosure and are not intended to limit the scope of the present disclosure.

INDUSTRIAL APPLICABILITY

In the solutions provided by the embodiments of the present disclosure, the terminal determines the transmission mode of the access signal according to the indication signaling of the base station and transmits the access signal. A complete set of access procedures is provided, which effectively increases the access success rate in the high frequency communication system.

What is claimed is:

1. A radio access method, comprising:
   transmitting, by a terminal, an access signal by a first method when a preset condition is satisfied; and
   transmitting, by the terminal, the access signal by a second method when the preset condition is not satisfied;
   wherein the first method comprises:
   receiving indication signaling transmitted by a base station, wherein the indication signaling comprises access manner notification signaling or a reference signal;
   determining a transmission mode of an access signal according to the indication signaling; and
   transmitting the access signal in the transmission mode, wherein the transmission mode comprises a transmit beam and/or a transmit beam direction,
   wherein the determining a transmission mode of an access signal according to the indication signaling comprises:
   determining the transmission mode according to the access manner notification signaling,
   or
   determining the transmission mode according to a reference signal detection, and
   wherein determining the transmission mode of the access signal comprises:
   determining a baseband precoding matrix and determining a baseband signal of the access signal according to the baseband precoding matrix; or
   determining a radio frequency precoding matrix and determining a radio frequency signal of the access signal according to the radio frequency precoding matrix; and wherein the second method comprises:
   selecting, by a terminal, N1 access channel resources from access channel resources and transmitting an access signal in N2 transmission modes; wherein N1 is a positive integer and N2 is a positive integer less than or equal to N1;
   wherein the access signal is transmitted in the N2 transmission modes each time within a preset number of transmissions; after the preset number of transmissions, the access signal is transmitted in N3 transmission modes; wherein N3 is a positive integer, and the N3 transmission modes are different from the N2 transmission modes; and
   wherein the transmission mode comprises a transmit beam and/or a transmit beam direction; wherein the preset condition is that an uplink channel and a downlink channel have reciprocity; and
   wherein the reciprocity comprises:
   the uplink channel and the downlink channel adopt a time division duplex, TDD, mode;
   the reciprocity exists between a channel for the base station to transmit a signal and a channel for the base station to receive a signal, and the reciprocity exists between a channel for the terminal to transmit a signal and a channel for the terminal to receive a signal; and
   an antenna port used by the base station to transmit the signal is the same as an antenna port used by the base station to receive the signal, and an antenna port used by the terminal to transmit the signal is the same as an antenna port used by the terminal to receive the signal.

2. The method of claim 1, wherein when the terminal transmits the access signal using the first method, the terminal occupies a first access channel resource to transmit the access signal to a base station; and
   when the terminal transmits the access signal using the second method, the terminal occupies a second access channel resource to transmit the access signal to the base station.

3. A non-transitory computer-readable storage medium, configured to store a set of instructions, wherein the set of instructions, when executed by at least one processor, implement the radio access method of claim 1.

* * * * *